US012173530B2

(12) United States Patent
Sarbanis

(10) Patent No.: US 12,173,530 B2
(45) Date of Patent: Dec. 24, 2024

(54) DOOR LOCK AND KNOB SYSTEM WITH INVISIBLE HUB

(71) Applicant: Lampros Sarbanis, Pireas Attikis (GR)

(72) Inventor: Lampros Sarbanis, Pireas Attikis (GR)

( * ) Notice: Subject to any disclaimer, the term of this patent is extended or adjusted under 35 U.S.C. 154(b) by 139 days.

(21) Appl. No.: 17/912,178

(22) PCT Filed: Mar. 9, 2021

(86) PCT No.: PCT/GR2021/000014
§ 371 (c)(1),
(2) Date: Sep. 16, 2022

(87) PCT Pub. No.: WO2021/191641
PCT Pub. Date: Sep. 30, 2021

(65) Prior Publication Data
US 2023/0131844 A1 Apr. 27, 2023

(30) Foreign Application Priority Data
Mar. 23, 2020 (GR) .............................. 20200100154

(51) Int. Cl.
*E05B 33/00* (2006.01)
*E05B 27/00* (2006.01)
*E05B 19/04* (2006.01)
*E05B 27/10* (2006.01)

(52) U.S. Cl.
CPC .......... *E05B 33/00* (2013.01); *E05B 27/0035* (2013.01); *E05B 27/0057* (2013.01); *E05B 19/04* (2013.01); *E05B 27/10* (2021.08)

(58) Field of Classification Search
CPC .......... E05B 33/00; E05B 27/00; E05B 27/10; E05B 27/0057; E05B 27/0035; E05B 19/04; E05B 17/14; E05B 35/00; Y10T 70/765; Y10T 70/7757; Y10T 70/7672
USPC ........................................................... 70/369
See application file for complete search history.

(56) References Cited

U.S. PATENT DOCUMENTS 249,124 A * 11/1881 Voos ...................... E05B 17/16 70/428
3,267,707 A * 8/1966 Adams .................... E05B 27/00 70/423
3,959,997 A * 6/1976 Williams .............. E05B 35/007 70/423
4,031,730 A * 6/1977 Kern ....................... E05B 17/14 70/423

(Continued)

FOREIGN PATENT DOCUMENTS

CN 111441657 B * 3/2021
KR 20160035475 A * 3/2016
WO WO-2021191641 A1 * 9/2021 ............. E05B 17/14

*Primary Examiner* — Suzanne L Barrett

(57) ABSTRACT

A lock system has a hub cap with a decentralized hole for key insertion and an appropriately inclined pin pressure level and inclined key pressure level. The hub cap is rotatable and it pushes a roller through the inclined pin pressure level which is located on the upper side of the hub cap, which pushes down a cluster of springs from locking and alignment pins, in order for the latter to align, allowing a circular case and a hub to rotate. At the same time, rotation of the hub cap pushes the key inside the hub in order to engage two gears together, which allows for turning of a knob to turn and disengage a latch bolt.

3 Claims, 8 Drawing Sheets

(56) References Cited

U.S. PATENT DOCUMENTS

| | | | | | |
|---|---|---|---|---|---|
| 4,838,061 | A * | 6/1989 | Tai-Seng | E05B 35/02 | 70/419 |
| 5,732,842 | A * | 3/1998 | Krause | B60K 15/05 | 220/254.1 |
| 7,866,194 | B2 * | 1/2011 | Liu | E05B 17/14 | 70/423 |
| 8,156,775 | B2 * | 4/2012 | Yamaguchi | E05B 85/16 | 70/357 |
| 8,397,547 | B2 * | 3/2013 | Liu | E05B 35/00 | 70/423 |
| 10,829,958 | B2 * | 11/2020 | Francesca | E05B 65/0025 | |
| 2010/0077811 | A1 * | 4/2010 | Liu | E05B 19/00 | 70/451 |
| 2010/0077815 | A1 * | 4/2010 | Liu | E05B 17/14 | 70/451 |

* cited by examiner

DOOR LOCK AND KNOB SYSTEM WITH INVISIBLE HUB

TECHNICAL FIELD

The invention refers to the technical field of fixed constructions more specifically to the field of locks, keys, door or window installations and safes. Even more specifically, it refers to their locks and parts, and in particular to secure locks that are not visible from the outside. Specifically, it refers to a door lock and knob system with an invisible hub.

BACKGROUND OF THE INVENTION

The door lock and knob system described in this invention with an invisible hub has not been previously described in the art.

To date, lock cylinders, also known as crankshafts, are generally divided into two categories. The simple cylinder, where the key used is with teeth and usually the cylinder has 5 or 6 balls and the safety cylinder, where the key is flat and has spots, known as imprints. The simple cylinder has few key combinations and so there is a good chance it will open easily with a foreign key or burglary tools. On the other hand, the security hub has millions of key codes and a violation must be made to be opened by someone.

Also further known are the control break cylinders, which have the default breaking system. That is, in case of a burglary, the cylinder breaks at a specific point, preventing it from being breached. The cylinder continues to operate for its holder even after the break. A controlled cutting system exists on both sides of a door.

The biggest disadvantage of cylinders to date is that they are visible. This means that regardless of the level of security they provide, they allow a burglar to intervene in the lock by trying to break it. Essentially, what is being sought is to increase the level of difficulty in a burglary and not to substantially prevent it. In addition, various solutions proposed to date, such as password entry, electronic locking, or rollers with different key sets per user, have inherent disadvantages that do not allow users to be fully secured.

SUMMARY OF THE INVENTION

It is thus the object of this invention to take advantage of the aforementioned disadvantages and shortcomings of the previous technology by proposing a door lock and knob system with an invisible hub.

A further object of this invention is to offer a lock and knob system, where the hub pins are not visible from the outside of the door.

A further object of this invention is to provide a door lock and knob system with an invisible hub, where the key is fully inserted into the hub and remains there when the door is opened, while it is extracted after opening it.

A further object of the invention is to present a door lock and knob system, where the safety of the lock does not depend on the coding of the keys and their possible combinations, but on the construction and the individual elements of the hub.

A further object of the invention is the presentation of a lock, knob, and key system, where the key is fully inserted into the lock, detached from its handle, contributing to its release and later extracted and reconnected to the handle.

Another advantage of the invention is that it has a suitable shape configuration that prevents visual access inside the house from the lock hole.

These and other objects, characteristics and advantages of the invention will become apparent in the following detailed description.

BRIEF DESCRIPTION OF THE DRAWINGS

The invention will become better understood to those skilled in the art with reference to the accompanying drawings in which the invention is depicted in an indicative, non-restrictive manner.

DETAILED DESCRIPTION OF THE INVENTION

Referring now to the accompanying drawings, we will describe indicative applications of the door lock and knob system with an invisible hub, according to an indicative application of the invention.

Figure 1:
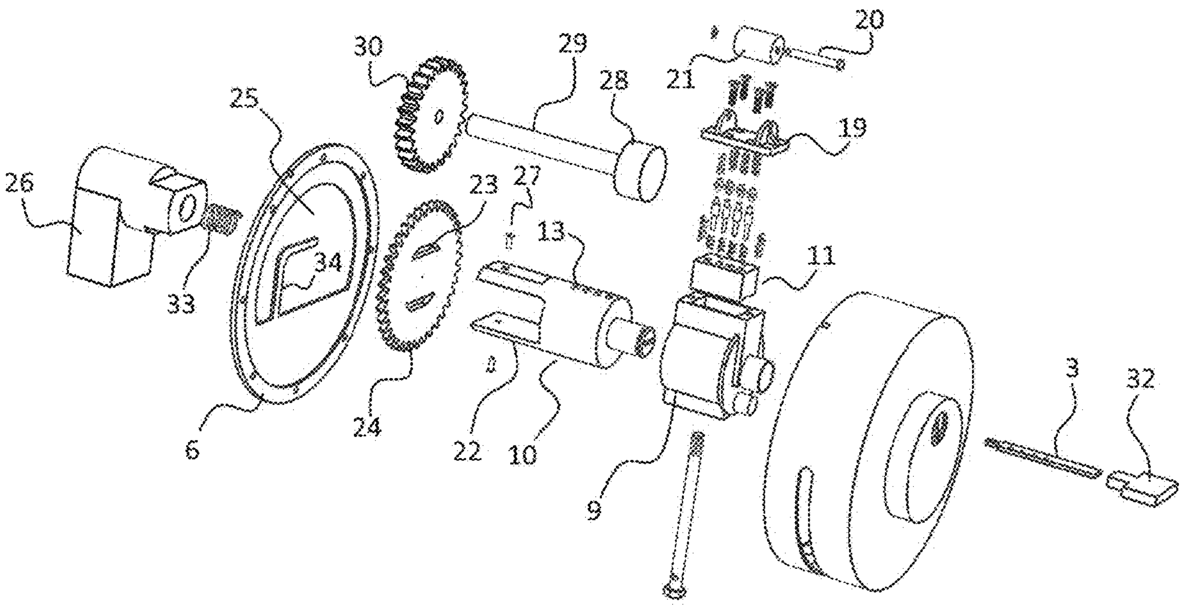
FIG. 1 shows in a three-dimensional perspective view of the individual components that make up the lock, knob, and hub of this invention.
Figure 5:
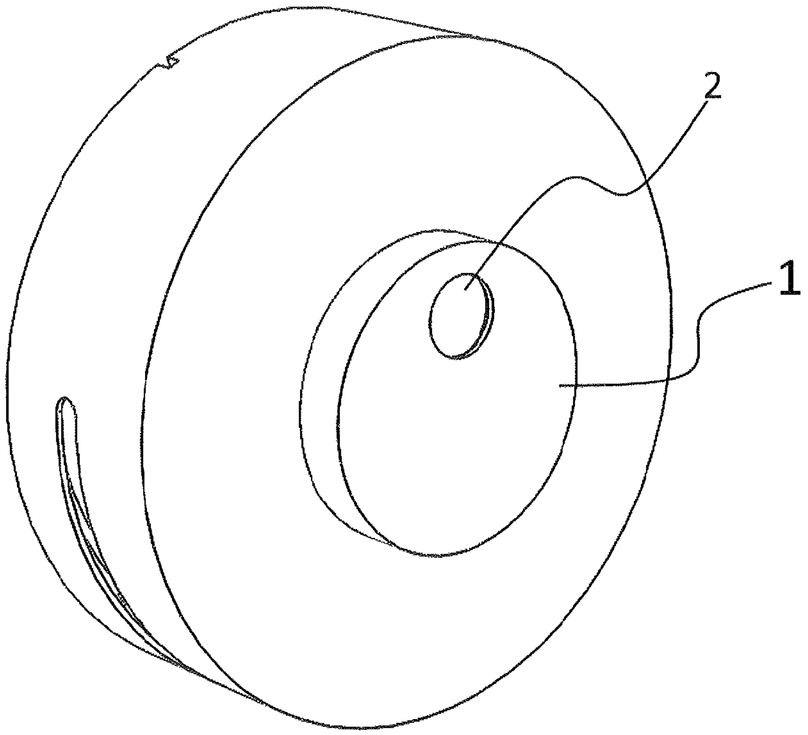
FIG. 5 shows the hub cap with the hole for inserting the key.
Figure 6:
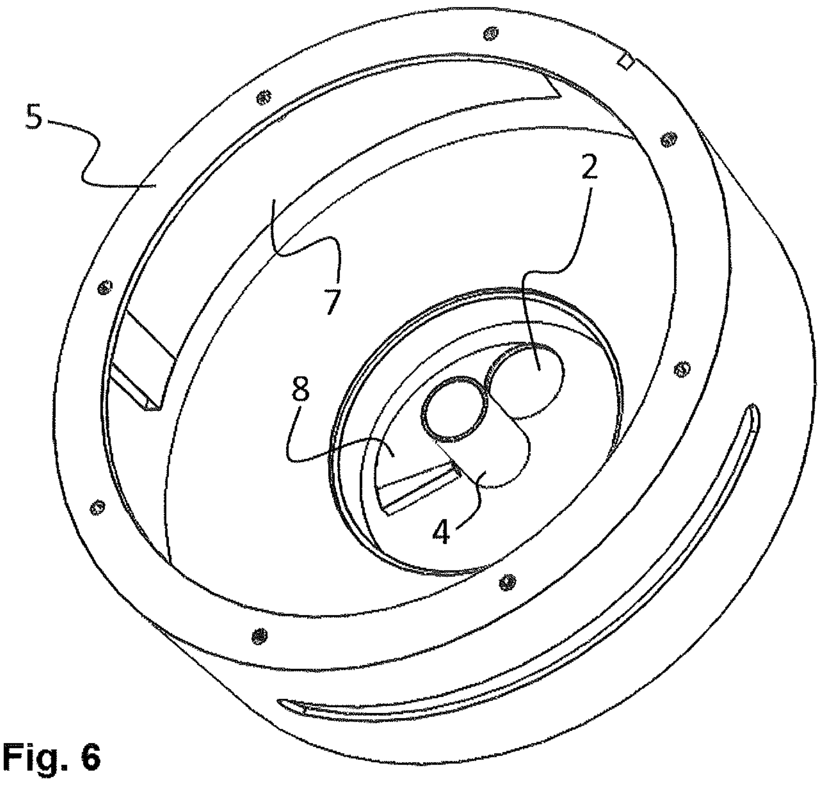
FIG. 6 shows the inside of the hub cap with the sloping sections for aligning the pins and the full insertion of the key to secure the door.

The inventive system consists of a hub cap (1), FIG. 5, which is round in shape and located on an outside of a door, with only a small cylinder protruding from it, which is grasped and spun by the user. A remaining portion of the cylinder is hidden behind an outer metal sheet of the door, preventing direct access to users. The hub cap (1) has a decentralized hole (2), as shown in FIG. 5, for the insertion of a key (3) into a key interface (40) of a hub (10), as shown in FIG. 1. Along a backside of the hub cap, in the center, the hub cap has a tube (4), as shown in FIG. 6. The hub cap (1) also has a rim (5) that has manufactured threads, to which a rear cover (6) is fixed in place by a screw while the rest of the hub cap (1) is rotated in one direction, for functional reasons, which will be explained later. Inside the hub cap (1), there are two inclined levels, the inclined level of pin pressure (7) and the inclined level of key pressure (8).

Figure 3:
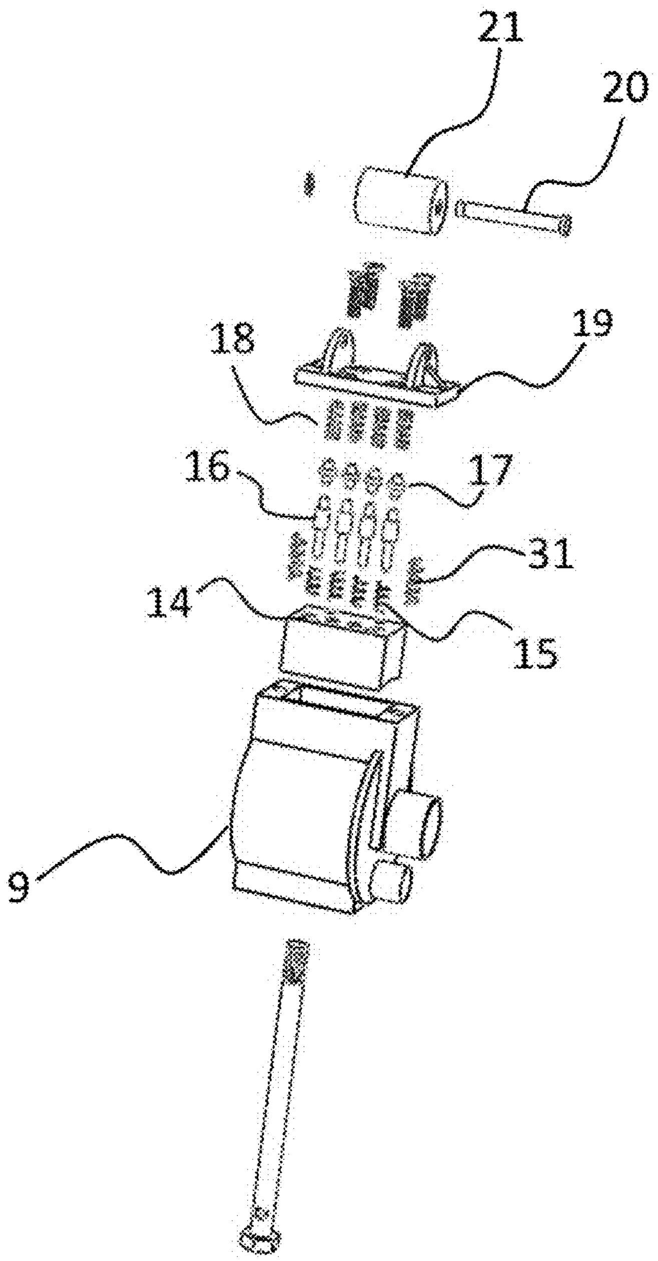
FIG. 3 presents in a more detailed picture the individual components of the circular case, the base, the pins and the roller with the base cover.
Figure 7:
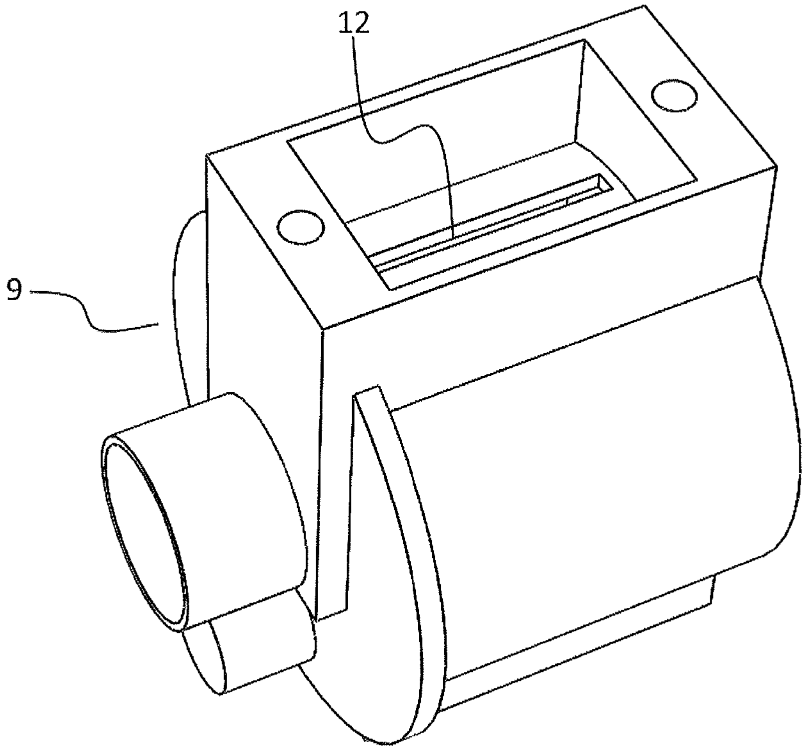
FIG. 7 shows the circular case with its notch on the upper side.

The tube (4) enters a corresponding pin of the circular case (9) into which the hub (10) enters. On the upper side of the circular case (9) there is a base (11), which is adjacent to the circular case (9). The circular case (9) further has a notch (12), FIG. 7, while the hub (10) and the base (11) have at least one row of similar vertical longitudinal holes (13), (14), where through the holes (13) of the hub (10) pass through repellent springs (15) and locking pins (16), as shown in FIG. 3. Thus, as the locking pins (16) are pushed upwards, due to the repellent springs (15), their upper part which is narrower, enters the notch (12) and prevents the hub (10) from rotating. Above each locking pin (16) there is a corresponding alignment pin (17), extruded by the corresponding extrusion spring (18). The alignment pins (17) and the extrusion springs (18) are located inside the longitudinal holes (14) of the base (11) and protrude downwards. At the top of the base (11) a base cover (19) is screwed, while the base cover (19) on its upper side has holes through which an axis (20) passes for the rotation of the roller (21).

The hub (10) of the system has the corresponding longitudinal holes (13), with those of the base (11) through which pass the locking pins (16). However, it also has two legs (22) which pass through notches (23) of the hub gear (24) and through a semicircular hole (25) in the rear cover (6) of the hub cap (1) end on the latch bolt (26) of the system, with which they are fixed screwed using screws (27) located above and below the legs (22) of the hub (10), as shown in FIG. 1. Above the lock there is a knob (28), FIG. 2, which through a shaft (29) ends in a gear (30). At rest, the knob (28) can rotate continuously, since the gear (30) does not withstand any resistance.

Figure 4:
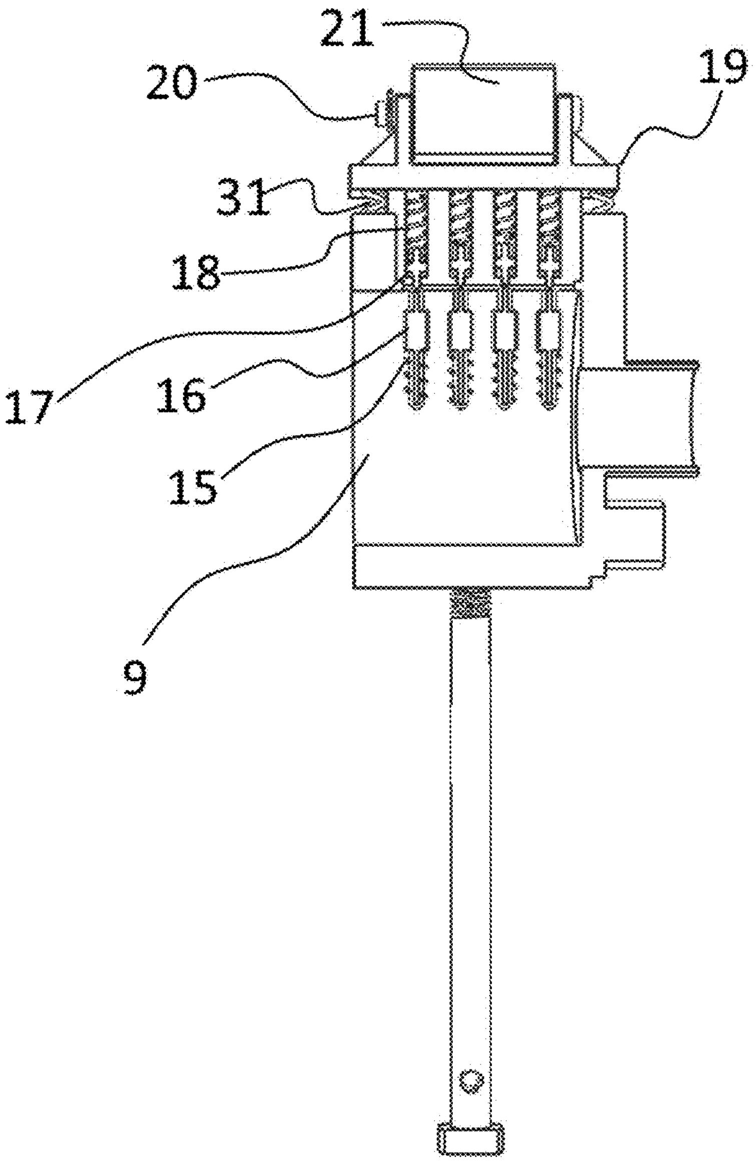
FIG. 4 shows the circular case in cross section, with the base and the individual locking elements, such as the pins and springs.

The purpose of the whole operation of the door lock and knob system (28) is to engage the knob gear (30) with the hub gear (24), so that the user rotates the knob (28), since, at the same time, the alignment of the pins (16), (17) has been made with the notch (12) of the circular case (9) to open the latch bolt (26) due to the use of the correct key. Initially, the beginning of the inclined pin pressure level (7) touches the roller (21), without exerting any force on it. When the lock is at rest, the alignment pins (17) rest on the locking pins (16), without pushing them downwards, because the base (11) is pushed upwards by its two fastening springs (31), FIG. 4. Once the base (11) begins to descend with the roller (21), because it is pressed by the inclined pin pressure level (7), then the alignment pins (17) push the corresponding locking pins (16) and only when there is a correct key with the correct fingerprints on it, align the pairs of pins (16), (17) with the notch (12), to achieve rotation of the hub (10). Therefore, the extrusion springs (18) must be stronger than the repellent springs (15) so that the alignment pins (17) can push the locking pins (16). At this point it should be noted that if one attempts to turn the hub cap (1) without a key then the alignment pins (17) will push the locking pins (16) further downwards, because there will be no key to offer resistance, and in the final position the alignment pins (17) will have passed through the notch (12) of the circular case (9) and will have entered the longitudinal holes (13) of the hub (10), resulting again in preventing the ability to rotate the hub (10).

For the operation of the system, the correct key (3) which has a detachable handle (32) should be inserted. The key (3) and handle connection (32) may be done magnetically or with a release button or in any other known way, but this is not a subject of this invention. With the complete insertion of the key (3) inside the hole (2) and after the detachment of the handle (32), the user begins to rotate the lid of the hub (1). During this rotation, two functions are performed simultaneously from the inclined planes.

Figure 8:
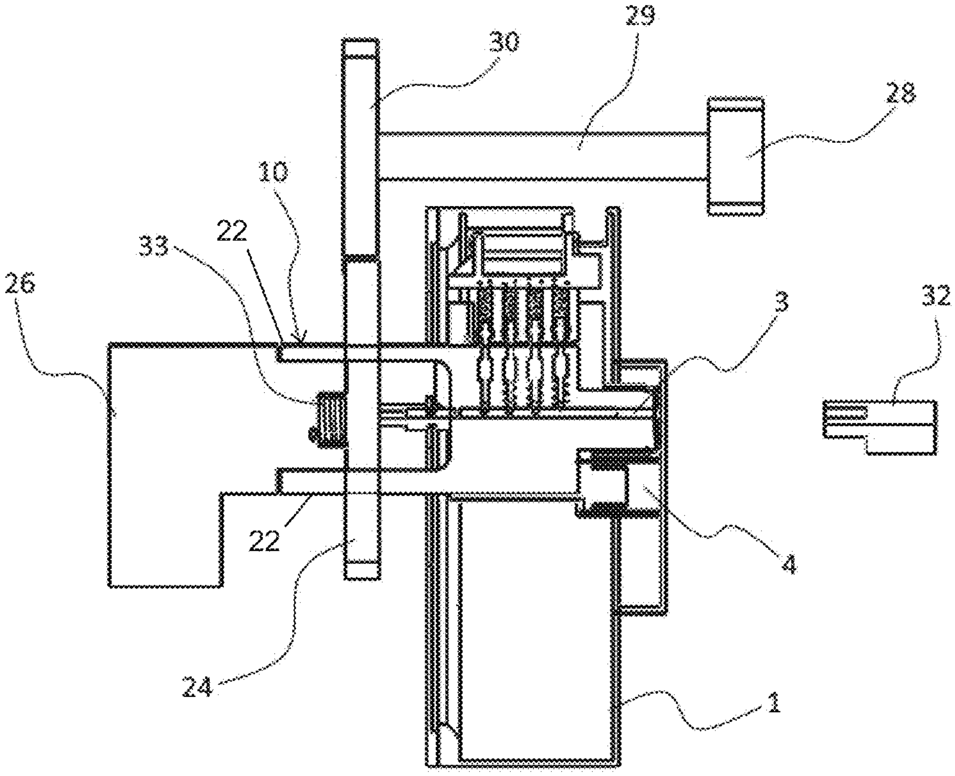
FIG. 8 shows positioning of the hub gear after insertion of the key and rotation of the hub cab causes the hub gear and the knob gear to align.

Because the inclined planes during the rotation have different constructive thickness along their entire length, the inclined pressure pin level (7) presses the rotating roller (21) and the inclined key pressure level (8) presses the key (3) in the same way increasingly inside the hub (10). Examining the result of the rotation of the inclined pin pressure level (7) concludes in the pressure of the roller (21) which rotates, but at the same time presses down on the base cover (19) and compresses the fastening springs (31), causing the base (11) and the base cover (19) to move downwards towards the circular case (9). This downward movement of the base (11) leads to compression of the repellent springs (15) and extrusion springs (18) in such way that if the correct key (3) is inserted, the alignment pins (17) and the locking pins (16), are aligned between the notch (12) of the circular case (9) and the hub (10), allowing its unrestrained rotation. At the same time, when the hub cap (1) is rotated, the inclined key pressure level (8) presses the key (3) moreover towards the inside of the hub (10). The two legs (22) of the hub (10) are located within the notches (23) of the hub gear (24), which is pushed out. This extrusion leads to the entanglement of the hub gear (24) with the gear (30), as shown in FIG. 8. The extrusion is achieved thanks to the specified, narrower front end of the key (3), which, while passing through a hole (42) in the back of the hub (10), presses the hub gear (24) to engage, as aforementioned, with the knob gear (30), as shown in FIG. 8. Thereby, the rotation of the knob (28) can now lead to the movement of the latch bolt (26), so that the door can be opened, since the legs (22) encapsulate and terminate on the latch bolt (26).

Figure 2:
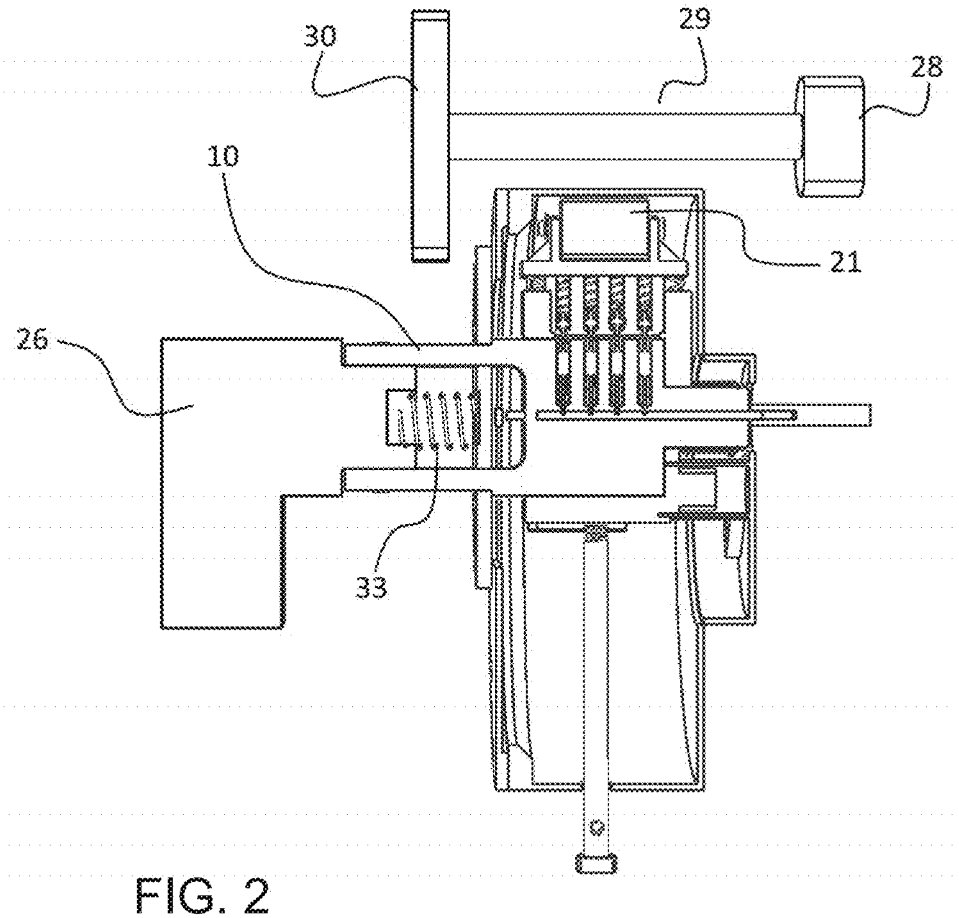
FIG. 2 shows in section the door lock and knob system of the invention, in a random snapshot, when entering the key.

On opening the door, the user turns the hub cap (1) upside down, so that the key (3) is extracted in order to be reconnected with the key handle (32) and the user to enter the house. The key (3) is removed thanks to a spring (33) located between the latch bolt (26) and the hub gear, as shown in FIG. 2, pressing the hub gear (24) back toward the circular case (10). This in turn pushes the key (3) out of the key interface (40) and hole (2) when the hub cap (1) is fully rotated to its initial position. In addition, when the system is at rest and in order to prevent inside visual access from the hole (2) of the lid, in the rear cover (6), there is a configuration (34) in the shape of an inverted C.

In addition, the existence of the configuration (34) prevents the insertion of any tool that would allow pressure to be applied to the hub gear (24) in order to engage it with the knob gear (30), so that by force, the hub (10) would be rotated using the knob (28). When the hub cap (1) is rotated and given that the back cover (6) rotates as well, this results in a displacement of the configuration (34), resulting in the hole (42) at the back of the hub (10) to be revealed, so that the narrowest end of the key (3) will push the hub gear (24).

Alternatively and additionally to the aforementioned, there may be more than one series of locking pins (16) and corresponding extrusion springs (18), repellent springs (15), as well as alignment pins (17) with the corresponding vertical longitudinal holes (14) in base (11).

It should be noted at this point that the description of the invention was made with reference to an indicative and non-limiting example of application. Therefore, any change or modification in terms of shape, dimensions, morphology, materials used and components of construction and assembly, as long as they are not a new inventive step and do not contribute to the technical development of the already known, are considered to be inclusive and within the aspects of the present invention.

The invention claimed is:

1. A door lock and knob system with invisible hub, comprising:

a knob with a shaft ending in a knob gear;

a hub cap that closes with a rear cover, wherein the hub cap has an outer perforated hole, and on a center inside has a tube, an inclined pin pressure level, and an inclined key pressure level;

a circular case having an opening configured to correspond to the outer perforated hole and having a notch, the circular case further secured to the tube of the hub cap and positioned within the hub cap;

a hub having two legs, a key interface, and vertical longitudinal holes, in which repellent springs and locking pins are positioned, the hub inserted within the circular case such that the key interface is positioned within the opening of the circular case and the outer perforated hole of the hub cap;

a hub gear secured to the hub and having two notches, wherein each leg of the two legs of the hub passes through a corresponding notch of the two notches of the hub gear and through a semicircular hole of the rear cover of the hub cap:

a latch bolt secured to an end of each said leg of the two legs of the hub;

a base having a series of holes corresponding to the vertical longitudinal holes of the hub, each hole of the series of holes configured to secure an alignment pin and an extrusion spring, wherein a base cover is secured to the base, the base cover having a shaft and a roller axially secured to and rotatable about the shaft, wherein the base is movably secured to the circular base by fastening springs securing the base cover to the circular base such that the series of holes and each alignment pin are alignable with the notch of the circular base;

wherein when inserting a key with an appropriate configuration inside at least the key interface and with rotation of the hub cap, the inclined pin pressure level pushes down the roller of the base cover, which respectively pushes the base cover toward the circular case, aligning each said alignment pin and the locking pins with the notch allowing the hub to rotate, while at the same time the key is pressed inside by the inclined key pressure level pushing the hub gear into the engagement position with the knob gear connected to the knob by the shaft, such that rotating of the knob rotates both the knob gear and the hub gear, allowing opening of the latch bolt by rotating the knob.

2. The door and knob system with invisible hub according to claim 1, wherein the hub has a second row of vertical longitudinal holes through which secondary repellent springs and secondary locking pins pass through, and the base has a second row of vertical longitudinal holes through which corresponding alignment pins and extrusion springs pass.

3. The door lock and knob system with invisible hub according to claim 1, wherein the rear cover has a configuration in a shape of an inverted C.

* * * * *